(12) United States Patent
Shepherd et al.

(10) Patent No.: US 8,401,069 B2
(45) Date of Patent: Mar. 19, 2013

(54) APPARATUS AND PROCESS FOR RE-TIMING VIDEO CUTS

(75) Inventors: James Shepherd, Havant (GB); Andrew Major, Petersfield (GB)

(73) Assignee: Snell Limited, Hampshire (GB)

( * ) Notice: Subject to any disclaimer, the term of this patent is extended or adjusted under 35 U.S.C. 154(b) by 2231 days.

(21) Appl. No.: 10/817,436

(22) Filed: Apr. 5, 2004

(65) Prior Publication Data

US 2005/0226318 A1    Oct. 13, 2005

(51) Int. Cl.
*H04N 7/12*    (2006.01)
(52) U.S. Cl. ............... 375/240.01; 348/700; 375/240.16
(58) Field of Classification Search .................... 375/240
See application file for complete search history.

(56) References Cited

U.S. PATENT DOCUMENTS

| | | | |
|---|---|---|---|
| 5,471,239 A * | 11/1995 | Hill et al. ..................... | 348/155 |
| 6,075,818 A | 6/2000 | Thomson | |
| 6,259,489 B1 | 7/2001 | Flannaghan et al. | |
| 6,587,506 B1 * | 7/2003 | Noridomi et al. ........ | 375/240.12 |
| 6,611,624 B1 * | 8/2003 | Zhang et al. .................. | 382/232 |
| 6,731,684 B1 * | 5/2004 | Wu ........................... | 375/240.12 |
| 6,871,003 B1 * | 3/2005 | Phillips et al. .................. | 386/55 |
| 7,139,029 B2 * | 11/2006 | Holland et al. ............... | 348/441 |
| 7,453,941 B1 * | 11/2008 | Yamori et al. ........... | 375/240.15 |
| 2003/0193614 A1 * | 10/2003 | Holland et al. ............... | 348/441 |
| 2005/0122426 A1 * | 6/2005 | Winger et al. ................ | 348/452 |

* cited by examiner

*Primary Examiner* — Jay Au Patel
*Assistant Examiner* — Jessica Prince
(74) *Attorney, Agent, or Firm* — Pearl Cohen Zedek Latzer, LLP

(57) ABSTRACT

A video process receives an interlaced sequence of input fields organized in a plurality of frames and identifies whether each video cut occurs at a frame boundary. Where a cut occurs otherwise than at a frame boundary, the processes generates a synthetic field by motion compensation and interpolation. This synthetic field replaces one of the fields at the cut, effectively re-timing the cut to a frame boundary. The process thereby outputs a sequence of output fields in which every cut is positioned at a frame boundary, the sequence of output fields containing the same number of fields as the sequence of input fields.

7 Claims, 9 Drawing Sheets

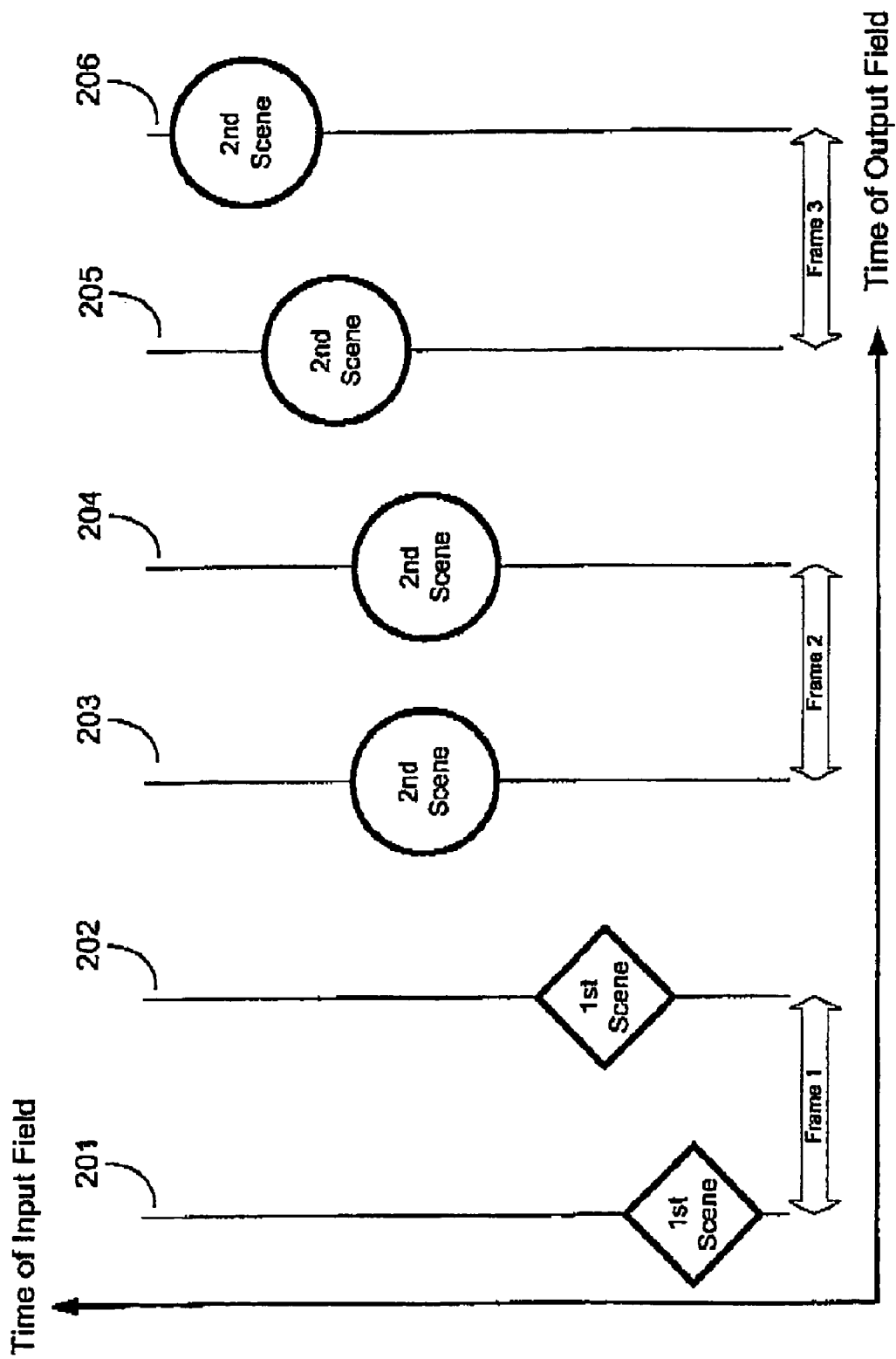

APPARATUS AND PROCESS FOR RE-TIMING VIDEO CUTS

BACKGROUND OF THE INVENTION

This invention concerns the processing of television signals or video data to obtain interlaced signals in a way which avoids the formation of incorrectly interlaced output.

Television represents moving images by reproducing a sequence of "still" images, each of which represents a temporal sample of an original moving image. Many television systems use "interlaced" scanning formats in which bandwidth is saved by dividing the scanning lines which make up a complete image into (usually two) cyclically repeating groups, and sending only one of these groups for each temporal sample. The full vertical resolution of the image is thus not achieved until a number of temporal samples have been displayed; and, the full temporal resolution is only available at a lower vertical resolution.

The widely-used 525- and 625-line television systems use an interlace factor of two so that two fields of half the total number of lines make up a frame (alternatively known as a picture).

More recently a number of television formats (especially high-definition formats) have been designed which do not use interlace; the full number of image lines is provided at each temporal sample. However, some transmission systems for these formats divide the image into two fields to improve compatibility with equipment designed for interlaced formats.

The relevant system standards define the order in which the two fields of a frame are transmitted. Unfortunately not all systems use the same order; sometimes the topmost line of the picture is in the first field, sometimes it is in the second. This choice is known as field dominance, and there are a number of situations in which it is critical that it is correctly observed.

Modern image processing techniques, compression for example, may combine information from more than one line of the picture, and it is not unusual to combine lines from different fields of the same frame. These processes will fail, or be degraded, if the field dominance is wrong.

There are several sources of field dominance errors. The simplest is where a cut from one image sequence to another occurs between the two fields of the same frame; in this case only half the lines will be available for the last image of the first sequence and for the first image of the second sequence. More complex problems can be caused when the temporal sampling rate of the images differs from that of the transmission system, for example where the speed of action is deliberately changed for effect.

For these reasons it is widely recognised that a method of correcting field dominance errors in a television signal is required. Known methods involve manually editing a recorded version of the programme. Usually cuts are located and incorrectly interlaced frames are removed. Alternatively a defective frame may be replaced by a repeat of a complete existing frame. Obviously deletion of frames changes the length of the programme, and may necessitate changes to the accompanying soundtrack.

These manual repair techniques are very time consuming and an automated process, especially one combined with a format conversion process offers many advantages.

Several methods of automatically detecting cuts are known (for example U.S. Pat. No. 6,075,818) and these methods may be utilised to prevent combining information across a cut in processes such as standards conversion, composite decoding, compression, image manipulation (e.g. warping) and image stabilisation. Noise reduction processes can be improved by using knowledge of cuts as disclosed in U.S. Pat. No. 6,259,489.

SUMMARY OF THE INVENTION

There can be provided a video process having an interlaced sequence of output fields comprising an output frame sequence wherein shot changes are re-timed automatically to coincide with frame boundaries and the said re-timing does not affect the number of output fields.

The invention also comprises a method of improving the presentation of shot changes in a video sequence of interlaced fields by automatically replacing at least one field at a shot change with a field derived from a preceding or succeeding field. Suitably, the replacement field is derived by copying the lines of a preceding or succeeding field. Alternatively, the replacement field is derived by spatial interpolation of a preceding or succeeding field. Advantageously, the replacement field is derived by motion compensated processing.

In a further aspect the invention comprises a method of creating a sequence of interlaced video fields from a video signal or video data wherein picture information is automatically shifted in time at a shot change so that field dominance is respected and the said time shifting does not alter the duration of the sequence.

In yet another aspect the invention consists of a method of automatically processing video or video data in response to associated shot-change data to give an interlaced output wherein the constituent fields of each processed frame are all derived from the same shot.

In one example, the present invention consists in a video process comprising the steps of receiving an interlaced sequence of input fields organised in a plurality of frames; identifying a cut between first and second input fields; identifying whether the cut occurs at a frame boundary and, where a cut occurs otherwise than at a frame boundary, generating from said second field a synthetic field and replacing said first field by said synthetic field, the process thereby outputting a interlaced sequence of output fields in which the cut is positioned at a frame boundary, the sequence of output fields containing the same number of fields as the sequence of input fields.

In another example, the present invention consists in video processing apparatus comprising a video input adapted to receive an interlaced sequence of input pictures organised in a plurality of frames; a control input adapted to receive video cut information; means for identifying a video cut occurring otherwise than at a frame boundary, and processing means for outputting an interlaced sequence of output pictures organised in a plurality of frames with each cut occurring otherwise than at a frame boundary in the input sequence being automatically retimed to occur at a frame boundary in the output sequence, the sequence of output fields containing the same number of fields as the sequence of input fields.

In still another example, the present invention consists in a video process comprising the steps of receiving a sequence of input fields organised in a plurality of frames; identifying a cut between first and second input fields; identifying whether the cut occurs at a frame boundary and, where a cut occurs otherwise than at a frame boundary, retiming the cut, the process thereby outputting a interlaced sequence of output fields in which each cut is positioned at a frame boundary, the sequence of output fields containing the same number of fields as the sequence of input fields.

In yet another example, the present invention consists in video processing apparatus comprising a video input adapted to receive a sequence of input frames; a video output adapted to provide a sequence of output fields organised in a plurality of frames; a field predictor adapted to receive a base field and to generate therefrom a synthetic field having a different timing; a field sequence detector; a video cut detector; and a field substitution element controlled through said field sequence detector and said video cut detector to substitute a synthetic field at a cut occurring otherwise than at a frame boundary, thereby to retime the out to occur at a frame boundary in the output sequence.

BRIEF DESCRIPTION OF DRAWINGS

An example of the invention will now be described with reference to the drawings in which:

FIG. 2b to 2e inclusive show sequences of output fields in accordance with various modes of operation of the invention.

DETAILED DESCRIPTION OF PREFERRED EMBODIMENTS

Figure 1:
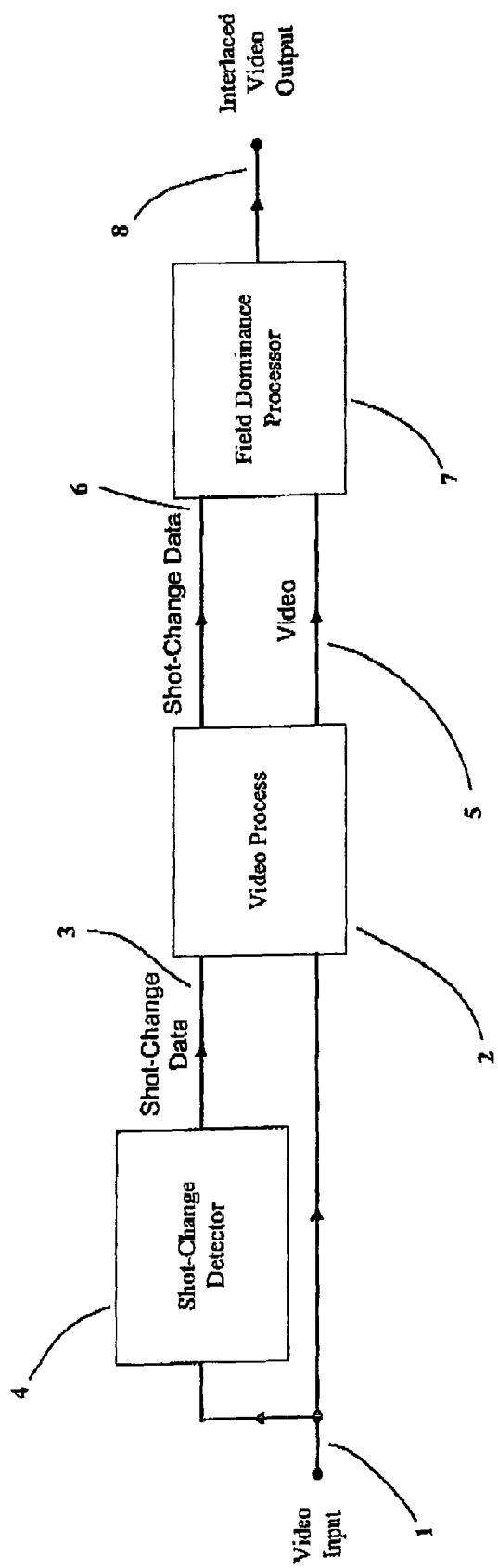
FIG. 1 shows a video process with field dominance correction.

Referring to FIG. 1, an input video sequence (1), which may in any format analogue, digital or file-structured digital; and may have an interlaced or progressive sampling structure, is input to a video process (2). The video has a temporal sampling structure such that different groups of spatial samples correspond to different moments in time. If the video is interlaced these groups will be fields, and if the video is progressive these groups will be frames.

Associated with the video (1) is cut or shot change data (3). This data has a value for each temporal sampling point of the video (1) indicating whether the image represented at that sampling time is the same scene as was represented at the immediately preceding sampling time, or whether the samples correspond to a new image of a different scene. The data (3) may be derived from the video (1) by a shot-change detector (4), or it may already be encoded into the video (1) or be in the form of metadata (such as an edit decision list, EDL) associated with the video. The shot-change detector (4), if present, operates in known manner, for example as described in U.S. Pat. No. 6,075,818.

The video process (2) can be arbitrary, its output may be interlaced or progressive and may have a temporal and/or spatial sampling structure different from its input. Preferably the process makes use of the data (3) to avoid combining samples from different scenes. The processed output video (5) is associated with processed shot-change data (6) indicating whether each temporally coincident set of output video samples represents the same scene as the preceding set.

If there is no temporal re-sampling involved in the process (2) the data (6) may simply be a delayed version of the data (3). If there is temporal processing it will be necessary to track the correspondence between input and output temporal samples in order to construct the output data (6).

The processed video (5) and the shot-change data (6) are input to a field dominance processor (7), which produces an interlaced video output (8). The processor (7) operates (as will be described below) to ensure that shot changes at the output (8) always occur at the same point in the sequence of interlaced fields.

Figure 2A:
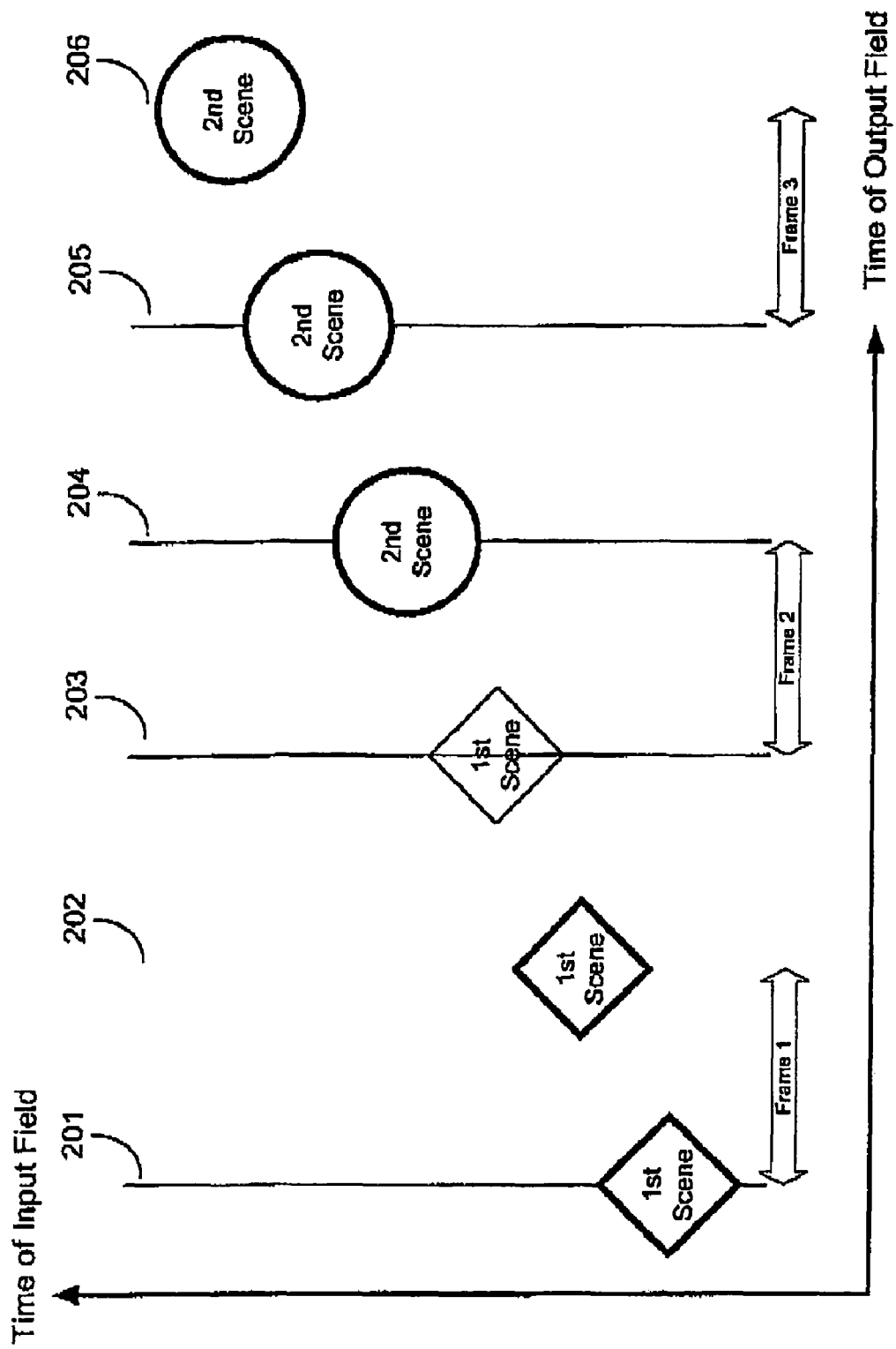
FIG. 2a shows a sequence of fields input to the dominance processor of the invention.

FIG. 2a shows an example of three frames of a possible 2:1 interlaced input to the field dominance processor. The horizontal axis of the figure represents the timing of the output fields, and the vertical axis represents the timing of the input fields. The first output frame comprises two interlaced fields (201) and (202), the next frame comprises the interlaced fields (203), (204) and so on.

The fields (201), (202) and (203) represent successive temporal samples of a first scene, and the immediately following fields (204), (205) and (206) represent successive temporal samples of a second scene. There is, therefore, a cut between the two scenes at the start of the second field (204) of the second frame, and the two fields (203) (204) of this frame contain material from different scenes so that the field dominance is incorrect. As mentioned above, a prior-art method of correcting this error is to edit out the frame comprising the fields (203) and (204), with consequent change to the running time of the video sequence.

Figure 2B:
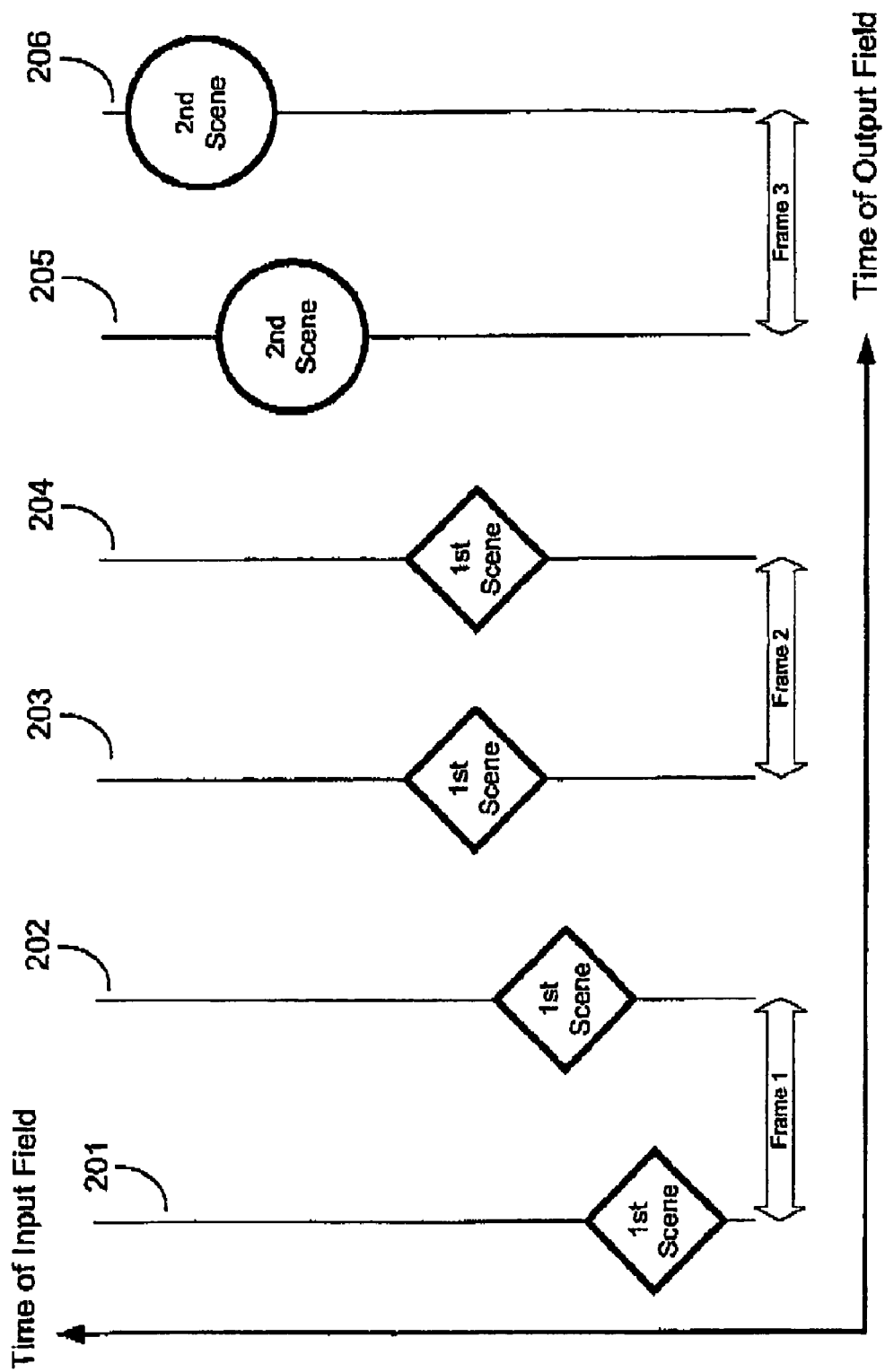

In one example of the invention the field dominance processor replaces the field (204) with a new, synthetic field constructed from the field (203). The result is shown in FIG. 2b; it can be seen that the field dominance is now correct, but there is a distortion of the motion profile of the first scene immediately prior to the cut.

Another example of the invention is shown in FIG. 2c. Here the field (203) is replaced by a new field constructed from the field (204). Again the field dominance error is corrected but now the motion profile of the second scene is distorted immediately after the cut. This is preferable to the method of FIG. 2b because the eye is more tolerant of motion profile distortion after a change of scene.

Figure 2D:
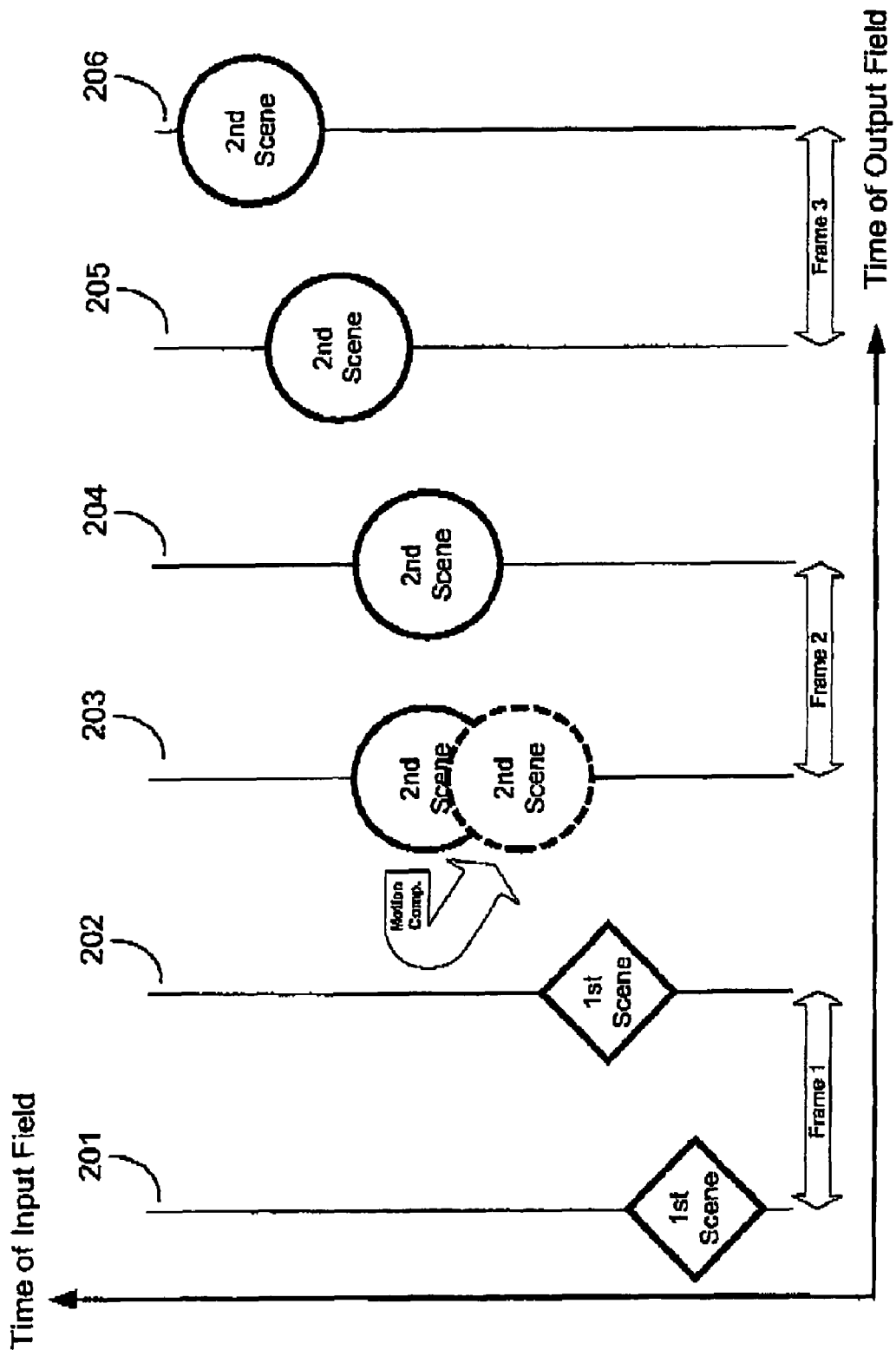
Figure 2E:
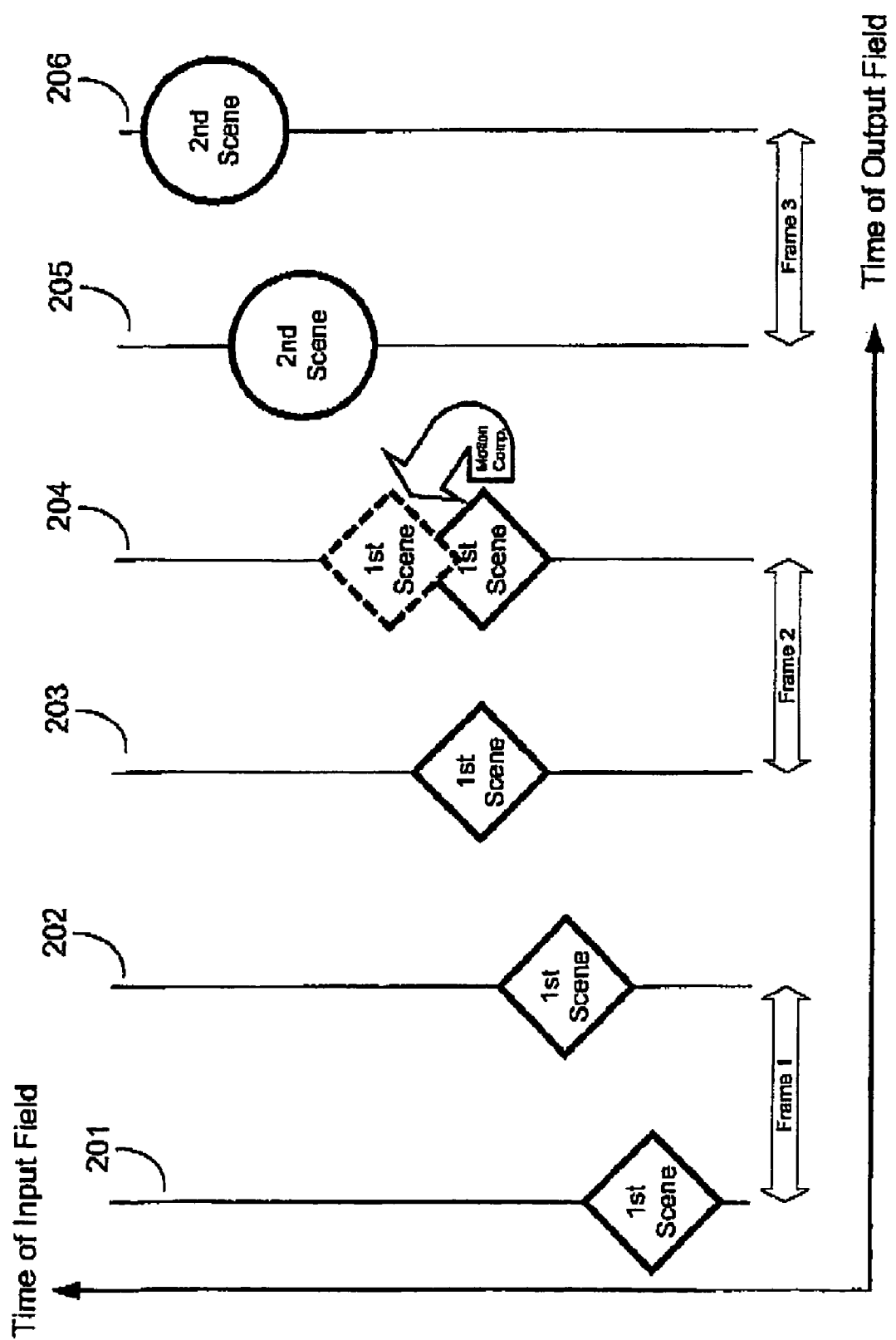

It is possible to avoid the motion profile distortion by using known motion compensated prediction methods to construct the new fields. Examples are shown in FIG. 2d (equivalent to FIG. 2c) and FIG. 2e (equivalent to FIG. 2b). Although the video is derived from incorrectly timed temporal samples, the positions of moving objects in the image are corrected by the use of motion vectors.

Figure 2F:
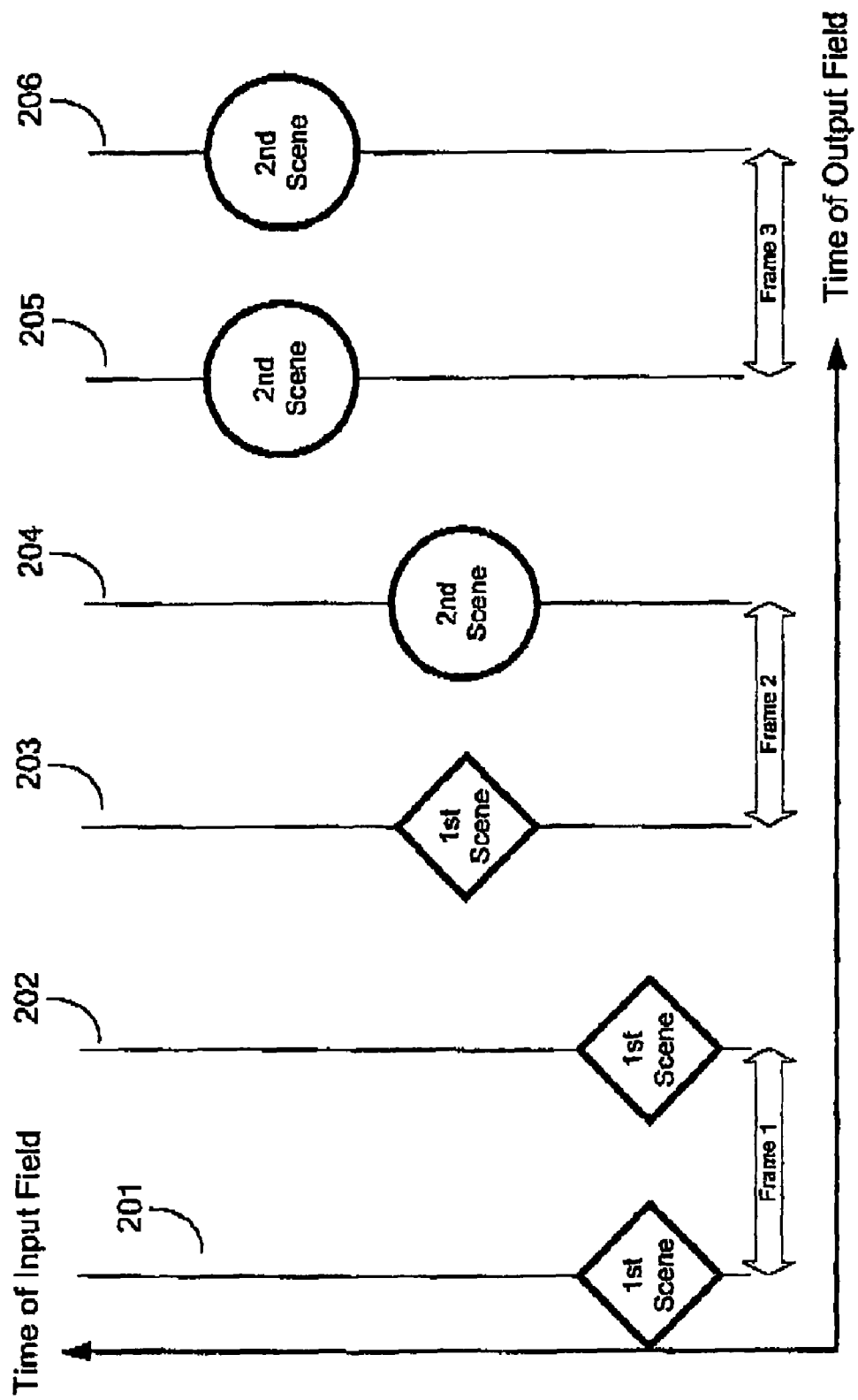
FIG. 2f shows an alternative sequence of fields input to the dominance processor of the invention.

The input to the dominance processor may not have a temporal sampling rate equal to the frame rate (as in FIG. 2a). It is common practice to present film with a frame rate of 25 Hz by means of 50 Hz-rate interlaced fields; it is also common to "package" progressive frames as a pair of interlaced fields. These both amount to the situation shown in FIG. 2f. Referring to this Figure it can be seen that both fields of each frame correspond to the same temporal sample of the original image. A field dominance error due to a cut is shown at the fields (203) (204). This error can be corrected in the same way as described previously by replacing the field (203) by information from the field (204) or vice versa. In this case there is no need for motion compensation as only spatial prediction is required. (However, if motion compensation is available it may be possible to improve the prediction by using information from other frames of the same scene.)

Figure 3:
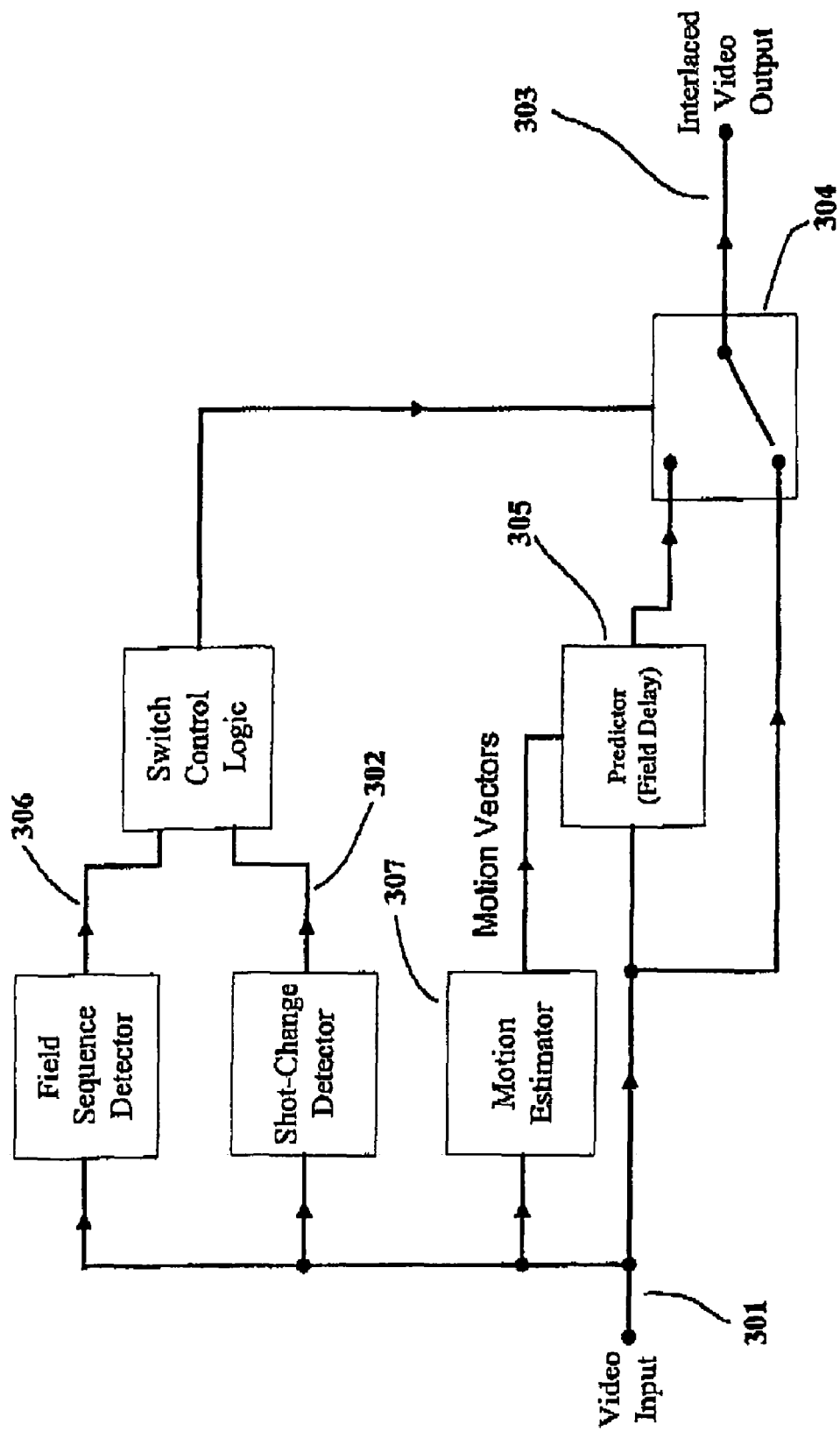
FIG. 3 shows a block diagram of an embodiment of the invention.

Some examples of the method of operation of the field dominance processor of the invention will now be described. FIG. 3 shows a method of carrying out the operation shown in FIG. 2b. A 2:1 interlaced video input (301) has associated shot-change data (302). A dominance-corrected video output (303) is derived from a changeover switch (304) which selects either the input video (301), or the output of a video predictor (305).

The switch (304) is controlled in dependence upon the shot-change data (302) and field-sequence data (306) derived from the input video (301). Normally the switch (304) selects the video (301) for output. However, when the shot-change data (302) indicates that the current input video field corresponds to a new scene, and the current field is not the first of a new frame (as indicated by the field-sequence data (306)), the switch takes a field from the predictor (305) in place of the field from the input (301).

The predictor (305) could use any of the known video prediction methods. The simplest predictor is a delay corresponding to an integral number of lines close to one field period. This is a very crude prediction and will give vertical position errors. These errors can be avoided by using an interpolator taking two or more lines of the input field to create the prediction. It would even be possible to use information from preceding frames in the interpolation, providing that the associated shot-change data shows that these frames are from the same scene as the one being processed.

The best prediction would be a motion compensated prediction making use of motion vectors, either newly-derived by a motion estimator (307), or already available either as part of the video (301), or associated with it. In the known art of motion-compensated prediction pixels or groups of pixels are moved to different positions (for example by manipulating the addressing of a store) in accordance with vectors describing the motion of the objects they represent. In this way the predicted field can be made to have the content of the previous field, but with objects in the positions which they would have occupied at the time of the current field.

If the shot-change data (302) is derived by the method of U.S. Pat. No. 6,075,818 (the contents of which are hereby incorporated by way of reference) the output (or intermediate data) from the motion estimator (307) can be used in its derivation.

Figure 4:
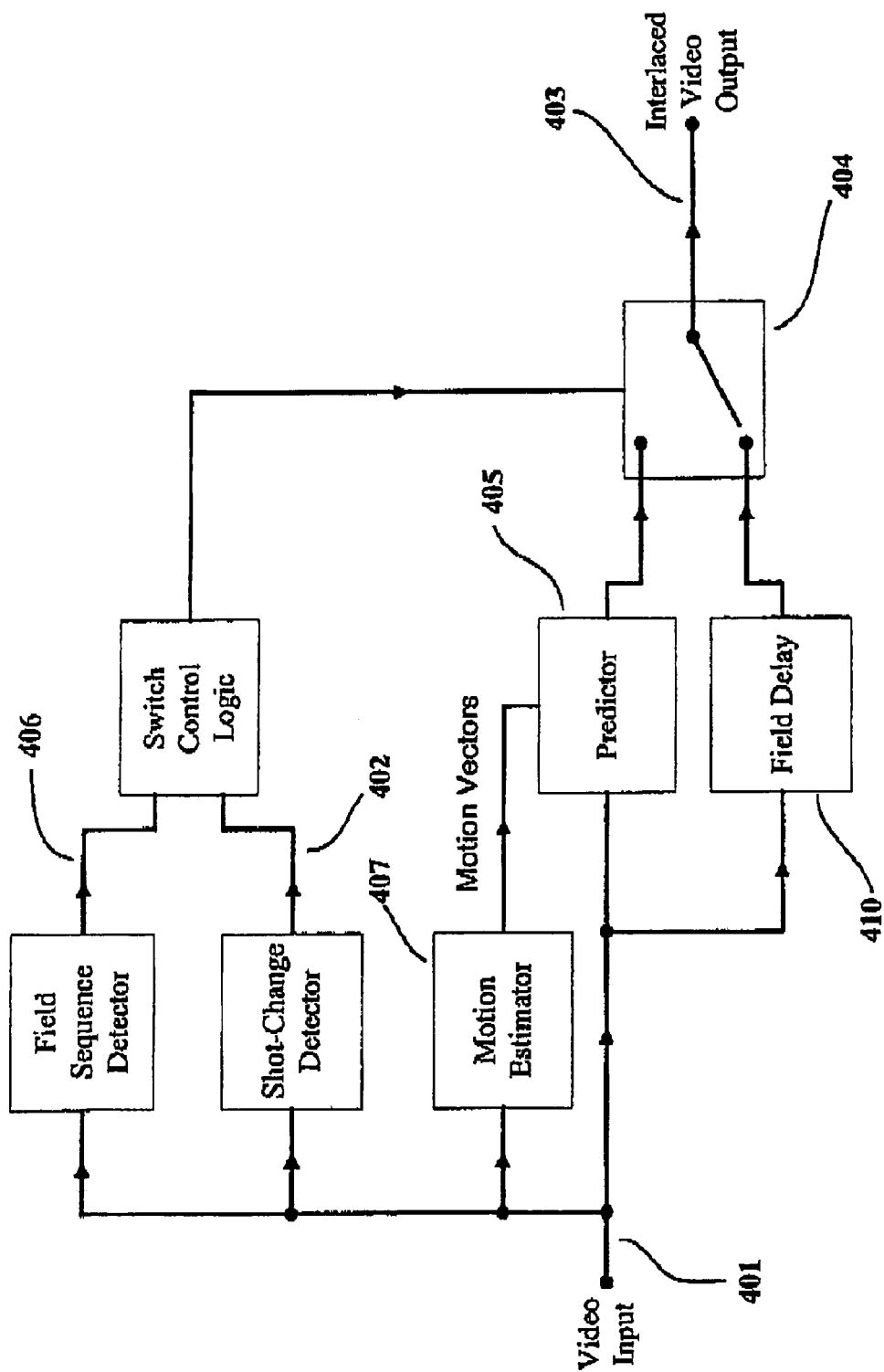
FIG. 4 shows a block diagram of an alternative embodiment of the invention.

FIG. 4 shows a method of carrying out the process shown in FIG. 2c. The method is similar to that shown in FIG. 3, and similar functions have the same identifying numerals, but with the prefix '3' replaced by '4'. In order to obtain ready access to the field after the current field, the 'normal' video path is via an integral-line-number delay close to one field period (410). The predictor (405) has a short delay so that when its output is selected by the switch (404), a field having the content of the field that follows the current output field is output. As with the previous example, the prediction can be by simple substitution of lines from the succeeding field, or by a suitable interpolation process, which could be motion compensated.

The invention is also applicable to the case where the input video is progressive and an interlaced output with correct field dominance is required. If progressive frames are input, and the frame rate of the input is similar to the field rate of the output, output fields may be easily constructed by spatially sub-sampling the input frames. However, as shot changes can occur on any input frame, there will be no guarantee that the output field dominance will be correct.

This problem may be solved by the invention as follows. Either the structure of FIG. 3 or FIG. 4 may be used, provided that the processing is modified so as always to include the necessary vertical sub-sampling in the video path. The prediction function is greatly simplified because any set of interlaced lines can be taken from any input frame; however, motion compensation of the prediction is still necessary to avoid motion profile distortion at cuts.

The invention has been described by way of example and other embodiments are possible. For example the technique can be applied to systems having more than two fields in each frame; in this case more than one field will need to be replaced by a predicted field at a wrongly-timed cut.

The invention claimed is:

1. A video process comprising the steps of
receiving an interlaced sequence of input fields organized in a plurality of frames;
identifying a cut between first and second input fields;
identifying whether the cut occurs at a frame boundary; and,
where a cut occurs otherwise than at a frame boundary, generating from said second field a synthetic field and replacing said first field by said synthetic field,
the process thereby outputting a interlaced sequence of output fields in which the out is positioned at a frame boundary, the sequence of output fields containing the same number of fields as the sequence of input fields.

2. A process according to claim 1, wherein the second field appears after the first field in the temporal sequence.

3. A process according to claim 1, wherein the step of generating a synthetic field from said second field, comprises a step of motion compensation such that objects represented in said second field are positioned in said synthetic field at the locations they are estimated to occupy at the time associated with said first field.

4. A process according to claim 1, wherein the step of generating a synthetic field from said second field, comprises a step of interpolation such that objects represented in said second field are positioned in said synthetic field with the vertical positioning associated with said first field.

5. A video process comprising the steps of
receiving a sequence of input fields organized in a plurality of frames;
identifying a cut between first and second input fields;
identifying whether the cut occurs at a frame boundary; and,
where a cut occurs otherwise than at a frame boundary, retiming the cut,
the process thereby outputting a interlaced sequence of output fields in which each cut is positioned at a frame boundary, the sequence of output fields containing the same number of fields as the sequence of input fields.

6. A process according to claim 5, wherein the step of retiming comprises generating a synthetic field through motion compensation.

7. A process according to claim 5, wherein the step of retiming comprises generating a synthetic field through interpolation.

* * * * *